US 12,233,491 B2

(12) United States Patent
Glaser et al.

(10) Patent No.: US 12,233,491 B2
(45) Date of Patent: Feb. 25, 2025

(54) WELDING METHOD FOR CONNECTING A FIRST CONNECTOR TO A SECOND CONNECTOR, THE USE OF THE WELDING METHOD, AND A WELDED CONNECTION

(71) Applicant: TE Connectivity Germany GmbH, Bensheim (DE)

(72) Inventors: Karlheinz Glaser, Bensheim (DE); Walter Weinerth, Speyer (DE); Wenting Yan, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 463 days.

(21) Appl. No.: 17/335,395

(22) Filed: Jun. 1, 2021

(65) Prior Publication Data
US 2021/0379686 A1 Dec. 9, 2021

(30) Foreign Application Priority Data
Jun. 4, 2020 (EP) .................................. 20178187

(51) Int. Cl.
*B23K 9/23* (2006.01)
*B23K 9/16* (2006.01)
(Continued)

(52) U.S. Cl.
CPC .............. *B23K 9/232* (2013.01); *B23K 9/16* (2013.01); *B23K 26/21* (2015.10); *B23K 26/323* (2015.10);
(Continued)

(58) Field of Classification Search
CPC ............ B23K 2101/32; B23K 2101/36; B23K 2101/38; B23K 26/244; B23K 26/22;
(Continued)

(56) References Cited

U.S. PATENT DOCUMENTS 4,540,969 A * 9/1985 Sugar ................. H01H 85/0458
337/248
5,210,928 A * 5/1993 Seshita ................... B23K 11/11
219/605

(Continued)

FOREIGN PATENT DOCUMENTS

CN 104379297 A * 2/2015 .......... B23K 26/037
EP 3454028 A1 3/2019
(Continued)

OTHER PUBLICATIONS

Sasaki NPL Reference english machine translation. (Year: 2006).*
(Continued)

*Primary Examiner* — Chris Q Liu
(74) *Attorney, Agent, or Firm* — Barley Snyder

(57) ABSTRACT

A welding method includes providing a first connector having a first end, providing a second connector having a second end for being welded to the first end, overlapping the first end and the second end, applying a contactless heating to a central section of the first end and melting an end section of the first end facing the second connector, and cooling the first end and the second end to form a weld connecting the first connector and the second connector. The first connector and the second connector extend in opposite directions from the weld.

23 Claims, 5 Drawing Sheets

(51) Int. Cl.
  *B23K 26/21* (2014.01)
  *B23K 26/323* (2014.01)
  *B23K 35/38* (2006.01)
  *B23K 37/00* (2006.01)
  *B23K 37/006* (2025.01)
  *B23K 101/32* (2006.01)
  *B23K 101/36* (2006.01)

(52) U.S. Cl.
  CPC ............ *B23K 35/38* (2013.01); *B23K 37/006* (2013.01); *B23K 2101/32* (2018.08); *B23K 2101/36* (2018.08)

(58) Field of Classification Search
  CPC .. B23K 11/10; B23K 11/0026; B23K 9/0035; B23K 9/007; B23K 3/085; B23K 1/0056; B21F 15/00; G01K 7/16; G01K 7/22; H01R 43/02; H01R 4/02
  USPC ................ 374/163, E7.018; 29/612, 619; 219/121.63, 121.64
  See application file for complete search history.

(56) References Cited

U.S. PATENT DOCUMENTS

| | | | | |
|---|---|---|---|---|
| 5,502,292 | A * | 3/1996 | Pernicka | B23K 26/244 219/121.64 |
| 9,175,999 | B2 * | 11/2015 | Paterek | G01F 23/02 |
| 10,505,286 | B2 * | 12/2019 | Suzuki | H01R 4/021 |
| 10,587,087 | B2 * | 3/2020 | Schlipf | H01R 4/60 |
| 2006/0237403 | A1 * | 10/2006 | Shareef | B23K 26/703 219/121.65 |
| 2009/0168842 | A1 | 7/2009 | Yokoi et al. | |
| 2010/0270275 | A1 * | 10/2010 | Nakamae | B23K 26/009 219/121.64 |
| 2011/0228812 | A1 * | 9/2011 | Suzuki | G01K 1/08 374/163 |
| 2014/0144893 | A1 * | 5/2014 | Yang | B23K 9/0026 219/137 R |
| 2015/0323392 | A1 * | 11/2015 | Mori | B23K 31/02 374/165 |
| 2016/0001403 | A1 * | 1/2016 | Matsumoto | C22C 21/16 219/137 R |
| 2017/0227406 | A1 * | 8/2017 | Noguchi | G01K 7/22 |
| 2019/0267723 | A1 | 8/2019 | Suzuki et al. | |
| 2020/0112015 | A1 * | 4/2020 | Tao | B23K 26/244 |
| 2020/0141812 | A1 * | 5/2020 | Hironaka | B23K 26/323 |

FOREIGN PATENT DOCUMENTS

| | | |
|---|---|---|
| GB | 2541917 A | 3/2017 |
| JP | H0731888 Y2 * | 7/1995 |
| WO | 2013072961 A1 | 5/2013 |

OTHER PUBLICATIONS

Sasaki, Laser bonding of Cu thin wire bundle and Dumet wire for wiring of electronic parts, 2006, Journal of the Japan Welding Society, vol. 24 No. 3, p. 191-199 (Year: 2006).*

Extended European Search Report, European Application No., 20178187.9-1016, European Filing Date, Nov. 11, 2020.

* cited by examiner

WELDING METHOD FOR CONNECTING A FIRST CONNECTOR TO A SECOND CONNECTOR, THE USE OF THE WELDING METHOD, AND A WELDED CONNECTION

CROSS-REFERENCE TO RELATED APPLICATIONS

This application claims the benefit of the filing date under 35 U.S.C. § 119(a)-(d) of European Patent Application No. 20178187.9, filed on Jun. 4, 2020.

FIELD OF THE INVENTION

The present invention relates to a method for connecting a first connector to a second connector and, more particularly, to a welding method for connecting a first connector to a second connector.

BACKGROUND

Connecting temperature sensors, e.g. a negative temperature coefficient (NTC) thermistor, to a stranded wire requires that the joint must be able to withstand high temperatures. In particular, the operating temperature in the application can be more than 180° C. Industrial lead-free soldering cannot cover those requirements, but welding connections can.

Welding is a fabrication or sculptural process that joins materials, usually metals or thermoplastics, by using high heat to melt the parts together and allowing them to cool, causing fusion. Welding is distinct from lower temperature metal-joining techniques, such as brazing and soldering, which do not melt the base metal. In order to weld, the weldability of the materials to be joined must be understood; weldability represents a quality of a welded component created through welding. The weldability of a component depends on the process. The welding process may be contactless, i.e. the energy source is not in contact with the welding components, as for example by an arc welding process or an energy beam welding process. Alternatively, the energy source can be in contact with the welding components, for example by electric resistance welding.

Further, weldability is the ability of a component made of a specific material to be welded under given manufacturing and design conditions, in such a way that it can fulfill its intended tasks over its service life. In particular, the weldability of a component depends on the joinability of the materials to be welded. In more detail, joinability refers to the material properties and represents material suitability for the application of certain welding processes. The technological properties, chemical behavior, and mechanical quality values of the material to be welded are taken into account.

A welded connection can be formed between a first connector, e.g. a stranded wire, and a second connector, e.g. a dumet wire which is commonly used by thermistors. In more detail, a connector, also referred to as electrical connector, is an electromechanical device used to join electrical conductors and create an electrical circuit.

It is known, as shown in FIG. 11 to align a stranded wire 1100 and a connecting part of a thermistor 1200 radially. In more detail, a weld 1300 forms a center of the welded connection. The stranded wire 1100 and the connecting part of the thermistor 1200 point along a radius from the weld 1300. Generally, the weld 1300 has an approximately ellipsoidal shape. According to the known configuration, a first half of the outer surface of the ellipsoidal shape is smooth and a second half of the outer surface opposing the first half comprises the stranded wire 1100 and the connecting part of the thermistor 1200.

The stranded wire 1100 and the connecting part of thermistor 1200 connected by the weld 1300 can be arranged axially. An axial orientation is an arrangement of the wires along the longitudinal axis, which is indicated by the dashed line 1400, of the connectors, i.e. an orientation along the axis of rotation of the connector bodies. In view of the state of the art, such a connection is achieved by bending, for example, the connecting part of thermistor 1200.

Such a bending process, however, has disadvantages such as increased space requirements, material stresses in the bended wire and/or the weld, and additional process step.

Especially when using contactless welding technologies such as Tungsten Inert Gas Welding (TIG) or Laser-Welding, the welding technologies do not arrange the welding elements, i.e. the wires to be connected, in an axial orientation before welding that would avoid the bending step. Welding two wires, wherein the ends of the two wires are facing opposite directions before welding, causes a weld between the two wires having a gap in the middle of the weld. Further, the small distances between the welding elements, i.e. the connectors, causes the welding elements to suffer by the heat applied.

SUMMARY

A welding method includes providing a first connector having a first end, providing a second connector having a second end for being welded to the first end, overlapping the first end and the second end, applying a contactless heating to a central section of the first end and melting an end section of the first end facing the second connector, and cooling the first end and the second end to form a weld connecting the first connector and the second connector. The first connector and the second connector extend in opposite directions from the weld.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in greater detail and in an exemplary manner using embodiments and with reference to the drawings. The described embodiments are only possible configurations in which, however, the individual features as described herein can be provided independently of one another or can be omitted.

Figure 1:
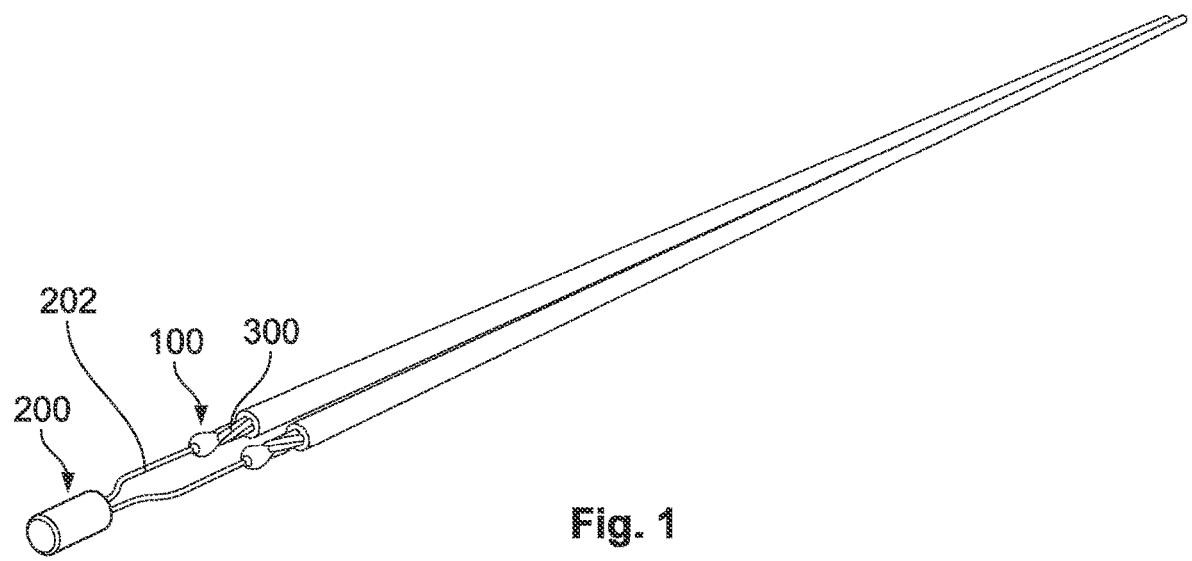
FIG. 1 is a perspective view of a thermistor connected to a stranded wire by a welded connection according to an embodiment.

Referring to FIG. 1, a schematic three-dimensional view of a thermistor or a thermocouple 200 connected to a stranded wire 300 by a welded connection 100 according to an embodiment is shown. The thermistor 200 has a connecting part 202 that is connected to the stranded wire 300. The stranded wire 300 and the connecting part 202 are arranged linearly; the stranded wire 300 and the connecting part 202 have a common longitudinal axis. The welded connection 100 surrounds an end of the connecting part 202 and an end of the stranded wire 300. The stranded wire 300 may also be referred to as a first connector 300 and the thermistor 200 may also be referred to as a second connector 200.

Figure 2:
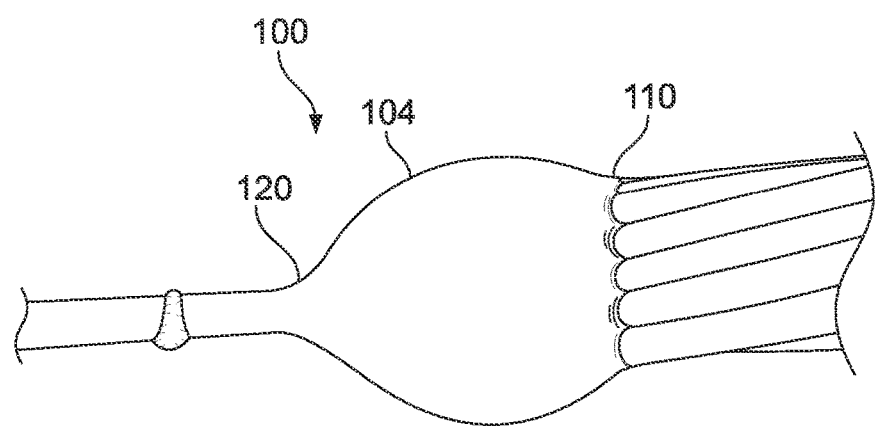
FIG. 2 is a detail perspective view of the welded connection of FIG. 1.
Figure 3:
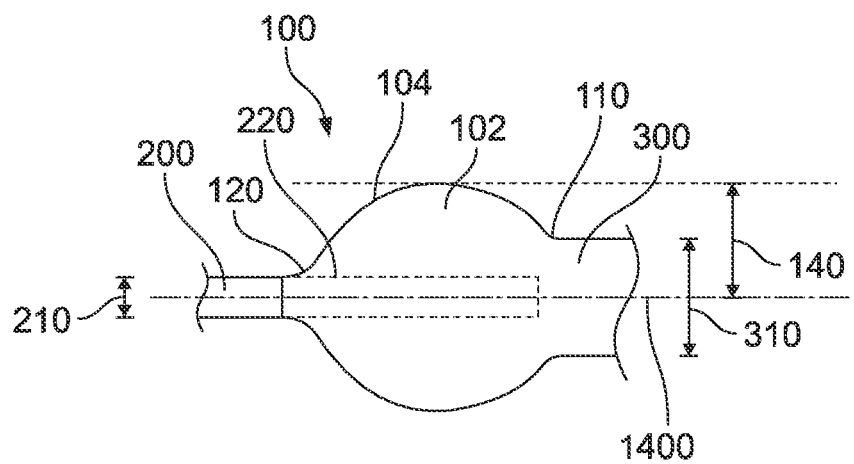
FIG. 3 is a schematic side view of the welded connection of FIG. 1.

The welded connection 100 is shown in greater detail in FIG. 2. FIG. 3 is a schematic of FIG. 2 used to explain the main characteristics of the welded connection 100 in greater detail.

The welded connection 100, as shown in FIGS. 2 and 3, connects the first connector 300 to the second connector 200. A weld 102 connects the first connector 300 and the second connector 200. The weld 102 is formed by melting an end section of the first connector 300. The weld 102 surrounds a second end 220, indicated by a broken line in FIG. 3, of the second connector 200. The first connector 300 and the second connector 200 extend in opposite directions from the weld 102.

The first connector 300 has a first diameter 310 and the second connector 200 has a second diameter 210. As shown in FIG. 3, the first diameter 310 is larger than the second diameter 210. In an exemplary embodiment, the first connector 300 has a diameter 310 of greater than or equal to 0.25 mm and less than or equal to 2.0 mm, or greater than or equal to 0.65 mm and less than or equal to 0.85 mm, and the second connector 200 has a diameter 210 of greater than or equal to 0.1 mm and less than or equal to 0.5 mm, or greater than or equal to 0.15 mm and less than or equal to 0.25 mm. According to the present application, a diameter is the diameter of a circle or the diagonal of a polygon, in particular the diameter of a rectangle.

As shown in FIGS. 2 and 3, a face 104 of the weld 102 forms has convex shape, approximately forming an ellipsoid. A symmetry axis of the weld 102 is formed by a common longitudinal axis of the first connector 300 and the second connector 200, which indicated by dashed line 1400 in FIG. 3.

As further shown in FIG. 2, the face 104 is only approximately an ellipsoid. The ellipsoidal shape indicates that the molten material has formed a drop, which indicates a strong cohesion of the weld 102 in the liquid phase, and thus, results in a strong connection of the weld 102 and the second end 220. Notably, the shape of the weld 102 deviates from the theoretical ellipsoidal shape by the protrusions caused by the second end 220. However, these protrusions do not influence the overall convex shaped face 104 of the weld. In particular, a convex shape is an indication of cohesion.

As shown in FIGS. 2 and 3, the weld 102 has a first toe 110, also referred to as first meniscus 110, and a second toe 120, also referred to as second meniscus 120, wherein the shape of the both toes 110, 120 deviate from the ellipsoidal shape of the face 104. In more detail, the toes 110, 120 are concave shaped regions, which are also referred to as meniscus. Concave meniscus occurs when the particles of the liquid are more strongly attracted to the solid, i.e. the second connector 200 and the stranded wire 300, (adhesion) than to each other (cohesion), causing the molten material to climb the walls of the connectors 200, 300. The formation of menisci is used in surface science to measure contact angles and surface tension. In a contact angle measurement, the shape of the menisci is measured e.g. optically with a digital camera. Menisci are a manifestation of capillary action, by which surface adhesion pulls a liquid up to form a concave meniscus.

As shown in FIGS. 2 and 3, the contact angles of the toes 110, 120 are less than 90° indicating that the liquid molecules of the molten material are strongly attracted to the solid molecules of the connectors 200, 300, and thus, the molten material spread out on the solid surface. Notably, the contact angles of the toes 110, 120 are extremely sensitive to contamination; values reproducible to better than a few degrees are generally only obtained under laboratory conditions with purified liquids and very clean solid surfaces.

As shown in FIG. 2, the weld has face 104 that has a convex shape and a first and second toe 110, 120 that have a concave shape. As further shown in FIG. 3, the face 104 is approximately a prolate spheroid and the common longitudinal axis 1400 is the symmetry axis of the weld 102. In an embodiment, an equatorial radius 140 of the weld has a diameter of 1.5 times the first diameter 310 of the first connector 300. Such a shape ensures that a second connector 200 with a thinner radius, such as a dumet wire 250, can be completely confined by the weld 102.

A welding method for connecting the first connector 300 to the second connector 200 will now be described with reference to FIGS. 4 to 8.

Figure 4:
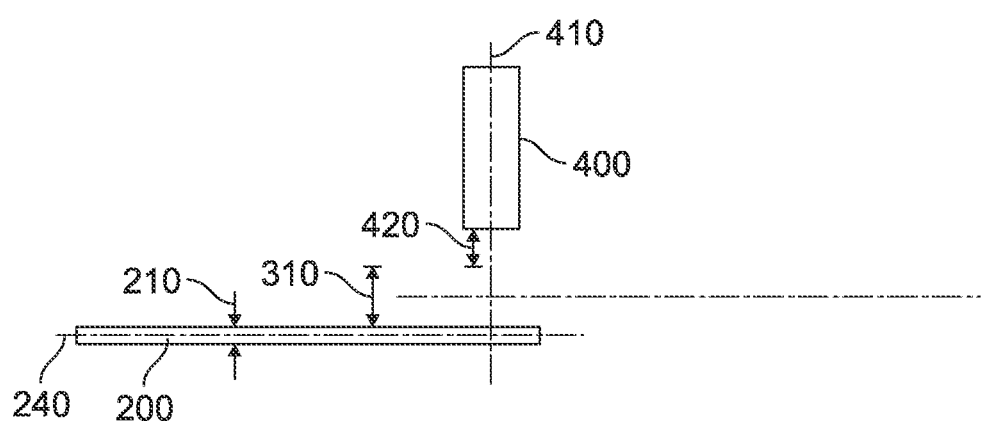
FIG. 4 is a schematic view of a first step of a welding method according to an embodiment.

FIG. 4 shows a schematic view of a first step of the welding method according to an embodiment. Firstly, the second connector 200 is provided. The second connector 200 has a second diameter 210. The second connector 200 defines a second longitudinal axis indicated by dash-dotted line 240 and is aligned in respect to an electrode 400. The electrode 400 is aligned along a main axis indicated by dash-dotted line 410. The energy is dissipated along the main axis 410 from the electrode 400. The electrode 400 is spaced apart from the second connector 200. In an embodiment, the distance between the second connector 200 and the electrode 400 is a first distance 310, which is equal to the first diameter 310 of the first connector, and a predetermined distance 420 of 0.5 mm. In the shown embodiment, the main axis 410 of the electrode 400 is perpendicular to the second longitudinal axis 240.

Figure 5:
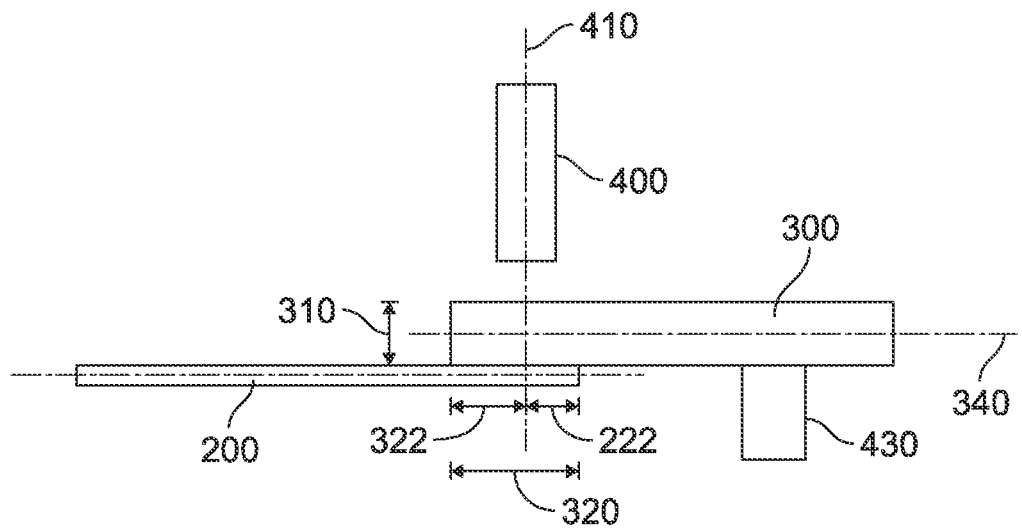
FIG. 5 is a schematic view of a second step of the welding method.

A second step of the welding method is described in FIG. 5, wherein the first connector 300 is provided. The first connector 300 defines a first longitudinal axis indicated by dash-dotted line 340 and is aligned in respect to the electrode 400. In an embodiment, the first connector 300 is aligned parallel to the second connector 200. Notably, the first and second step of the method may be interchanged.

The first connector 300 has a first end and the second connector 200 has a second end, the second end for being welded to the first end. In an embodiment, the first end has a length of at least one diameter 310 of the first connector 300, and in the embodiment shown in FIG. 5, the first end has a length 320 of two times the diameter 310. In other embodiments, the length 320 is at least three times the diameter 310, or is greater than three times and less than four times the diameter 310. The first end of the first connector 300 overlaps a second end of the second connector 200. In other words, the lateral surfaces of the ends are connected by a lap joint, i.e. the lateral surfaces are abutting, and the base surfaces of the ends of the two connectors 200, 300 are facing opposite directions.

A central section of first end is aligned with respect to the main axis 410 of the electrode 400. Thus, a length 322 of the end section of the first end shown in FIG. 5 has a length less than the length 320 of the first end. In an embodiment, the length 322 of the end second is less than one diameter 310 of the first connector 300. Additionally, a second end section of the second connector 200 overlaps with the first end of the first connector. In an embodiment, a length 222 of the second end section is less than or equal to one diameter 310 of the first connector 300.

As shown in FIG. 5, the central section of the first end is arranged in the middle of the axial extension direction of the first connector 300. In other words, an overlapping region of the first end and the second end is mirror symmetrical with respect to the main axis 410 of the electrode 400. A cathode 430 is connected to the first connector 300.

Figure 6:
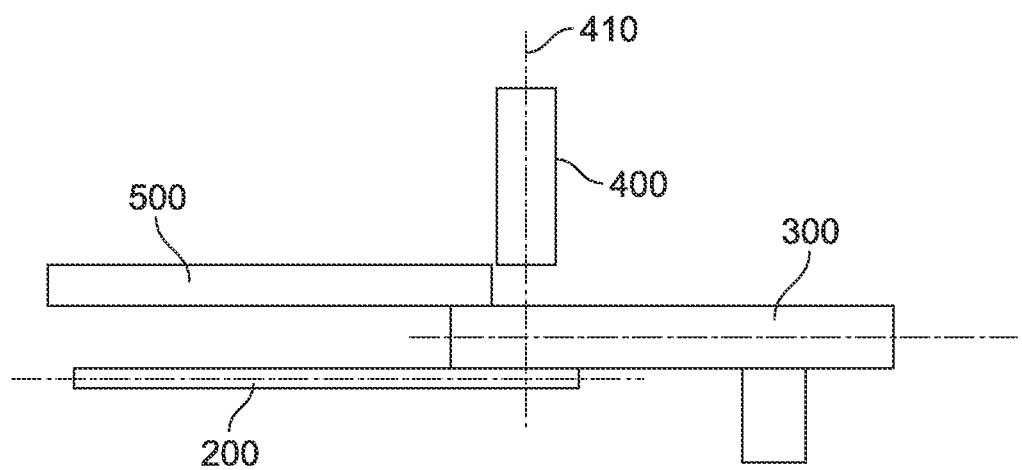
FIG. 6 is a schematic view of a third step of the welding method.

In a third step of the welding method, as shown in FIG. 6, a heat shield 500 is provided, the heat shield 500 covering, during the heating, at least partly the end section of the first end. The second end of the second connector 200 and the heat shield 500 are arranged on opposing sides of the lateral surface of the first end of the first connector 300. In other words, the second end of the second connector 200, the first end of the first connector 300, and the heat shield 500 are arranged on the main axis 410 of the electrode 400 with decreasing distance to the electrode 400, respectively. The lateral surface of the first connector 300 is the area of all the sides of the object, excluding the area of its base and top; such a configuration optimally employs the adhesive effects. The heat shield 500 can be made of a ceramic material.

The heat shield 500 influences adhesive forces. In more detail, adhesive effects influence the shape of the melted material. In more detail, in surface science, the term adhesion refers to dispersive adhesion. In a typical solid-liquid-gas system (such as a drop of liquid, i.e. the melted material on a solid, i.e. the first connector 300 and the second connector 200 surrounded by air or an welding gas) the contact angle is used to evaluate adhesiveness indirectly. Generally, cases where the contact angle is low are considered of higher adhesion per unit area. This approach assumes that the lower contact angle corresponds to a higher surface energy. By embedding the second connector 200, tipping the melt of the first connector 300 around the second connector 200, the joint becomes insensitive to peel forces. The quality of the joint can be seen from the contact angle. The contact angle is also referred to as wetting angle. Furthermore, the heat shield 500 influences the tensile strength by protecting the second connector 200 against notching.

The contact angle of the three-phase system is a function not only of dispersive adhesion (interaction between the molecules in the liquid and the molecules in the solid) but also the presence of the heat shield 500. In other words, the dissimilar materials and surfaces of the melted material and the heat shield 500 increases the wetting of the weld to the connectors 200, 300. Wetting is the ability of a liquid, i.e. the molten material, to maintain contact with a solid surface, i.e. the first and second connector 200, 300, resulting from intermolecular interactions when the two are brought together. Thus, by cooling down the molten material a particularly strong connection is realized.

Figure 7:
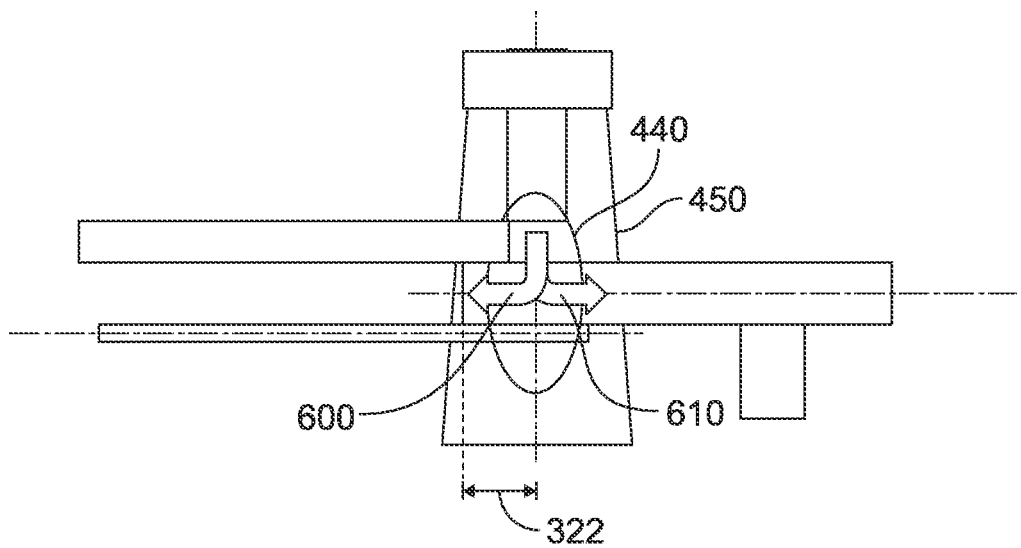
FIG. 7 is a schematic view of a fourth step of the welding method.

A schematic view a fourth step of the welding method is described in FIG. 7, showing the contactless heating of the central section of the first end. In the shown embodiment, the central section is heated using an arc 440. Additionally, an inert gas 450 is protecting the welding area. Contactless welding enables a fast process which is easily automated, and thus, making the process highly productive.

The heat is contactless transferred via process such as an arc welding process, for example a gas tungsten arc welding process, or an energy beam welding process, for example a laser beam or an electrode beam. Tungsten inert gas (TIG) is useful for welding thin materials, this method is characterized by a stable arc and high quality welds, but it requires significant operator skill and can only be accomplished at relatively low speeds. In particular, a follow rate of the inert gas, e.g. argon, allows to be adapted so that the surface appearance of the weld 102 can be improved. Energy beam processes are extremely fast, and are easily automated, making them highly productive. The primary disadvantages are their very high equipment costs and a susceptibility to thermal cracking.

FIG. 7 shows the heat flux in the first connector 300. The heat is conducted by the first connector 300. The heating of the central section of the end section allows an asymmetric heat dissipation with regard to opposing directions of the first connector 300. A first part 600 of the heat is conducted to the end section. As the end section is short, the heat is confined and the end section is heated up until the end section is melting. During heating, the end section transforms from a solid to liquid having an ellipsoidal shape. A second part 610 of the heat is conducted to a main section of the first connector 300, the main section is the part of the first connector 300 opposing the end section. The length 322 of the end section is shorter, and in an embodiment negligible, compared to the length of the main section of the first connector 300. Thus, the second part 610 of the heat is not sufficient to melt the main section of the first connector 300. The overall heat capacity of the first connector 300 is large compared to the heat capacity of the end section. The molten mass confines additionally the second end of the second connector 200. Thus, by overlapping the first end and the second end in an axially orientated direction before heating, a particularly space saving arrangement is realized.

In an embodiment, the first connector 300 has a higher thermal conductivity than the second connector 200. Therefore, only little heat can be dissipated via the second connector 200 and the end section heats up faster than the main section. Additionally or alternatively, the first connector 300 has a lower melting temperature than the second connector 200. Thus, the end section of the first connector 300 melts first.

Figure 8:
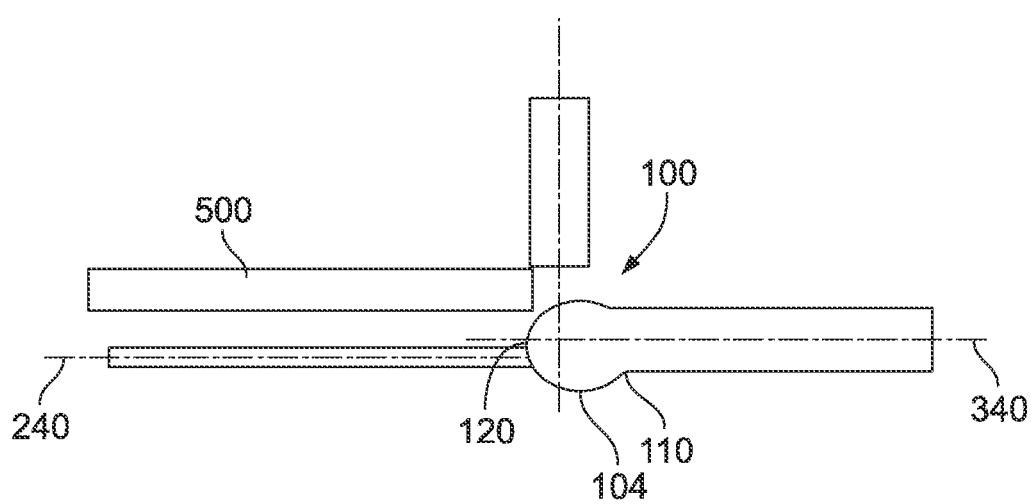
FIG. 8 is a schematic view of a fifth step of the welding method.

A schematic view a fifth step of the welding method is described in FIG. 8, showing the welded connection 100 after melting the end section. The method includes the step of cooling the first end and the second end so that the molten mass hardens. The weld 102, which is hardened by the phase transition from liquid to solid, connects then the first connector 300 and the second connector 200. According to the present invention, the first connector 300 and the second connector 200 extend in opposite directions from the weld 102. Such a connection enables an axial orientation of the welding partners without bending one partner after cooling down the weld. The welded connection 100 is the same as described above with regard to FIGS. 2 and 3 and a detailed description thereof is omitted. In addition to FIGS. 2 and 3, the side view of FIG. 8 shows that the first longitudinal axis 340 and the second longitudinal axis 240 are not collinear. This, however, does not influence the convex shape of the face 104 and the concave shape of the first and second toe 110, 120.

The welded connection 100 makes a bending step of one connector in order to achieve axial orientation after welding unnecessary. Additionally, such a welding connection is a particularly strong and the operating temperature in an application using such a connection 100 can be more than 180° C.

FIG. 8 shows the heat shield 500 and the power source 400. The close arrangement of the heat shield 500 supports the forming of the convex shape of the face 104 and the concave shape of the second toe 120. Thus, a particularly strong connection can be realized. Further, the heat shield 500 improves the melting process by efficiently confining the heat.

Figure 9:
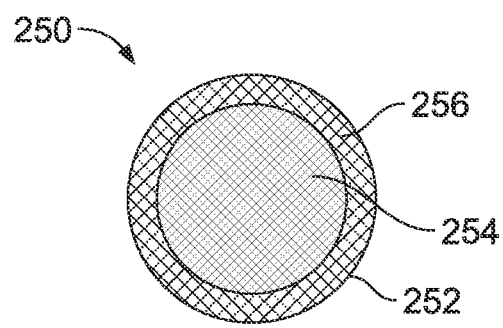
FIG. 9 is a sectional end view of a dumet wire.

FIG. 9 shows a cross-sectional schematic view of a dumet wire 250 used for forming the second connector 200. Dumet is a portmanteau of "dual" and "metal," because it is a heterogeneous alloy, usually fabricated in the form of a wire with an alloy core and a copper cladding. These alloys possess the properties of electrical conductivity, minimal oxidation and formation of porous surfaces at working temperatures of glass and thermal coefficients of expansion which match glass closely. These requirements allow the alloys to be used in glass seals, such that the seal does not crack, fracture or leak with changes in temperature. The dumet-wire 250 is a copper clad wire 252 with a core 254 of nickel-iron alloy. A component body 256 is encapsulated with glass. The core 254 has a low coefficient of thermal expansion, allowing for a wire with a coefficient of radial thermal expansion which is slightly lower than the linear coefficient of thermal expansion of the glass, so that the glass-to-metal interface is under a low compression stress.

Figure 10:
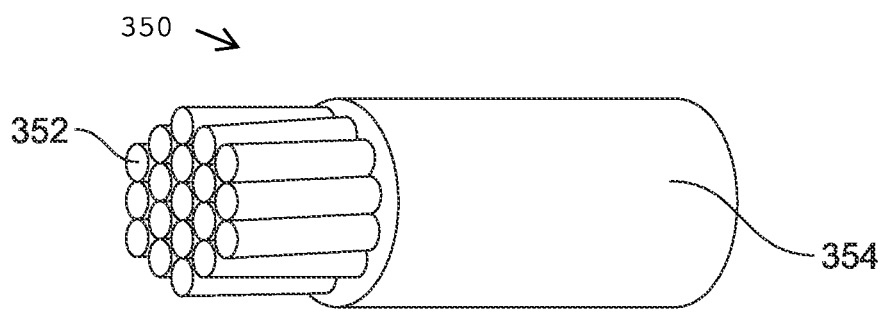
FIG. 10 is a perspective view of a stranded wire.
Figure 11:
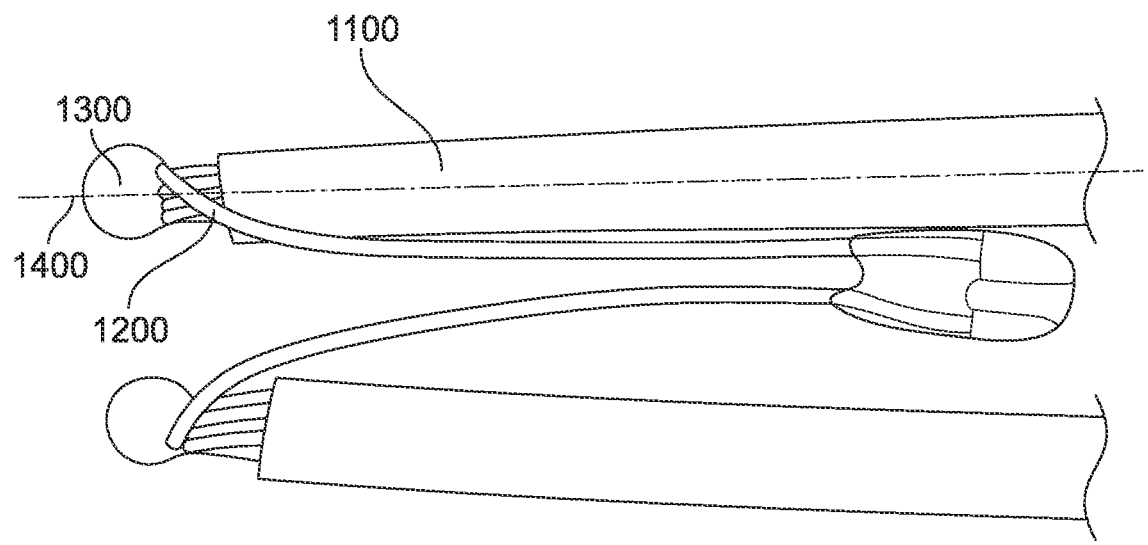
FIG. 11 is a perspective view of a welded connection according to the prior art.

FIG. 10 shows a cross-sectional schematic view of a stranded wire 350 that can be used as the first connector 300. The stranded wire 250 is composed of a number of small wires 352 bundled or wrapped together to form a larger conductor. The small wires 352 are cladded by an insulation layer 354, e.g. a high temperature fluoropolymer. Alternatively, a lead frame or a massive wire may be used instead as first connector 300.

In an embodiment, the welded connection 100 may by be used to connect a connecting terminal of a thermocouple 200 to a connecting terminal of a connector 300.

The welding connection 100 optimally uses the installation space and provides a particularly robust connection that can used at operation temperatures higher than 180° C. The connection 100 can be fabricated at low costs. Additionally, the connection 100 enables an easy visual inspection and can be used to connect elements that have different material compositions and geometrical dimensions. Such dimension allows a strength of the weld connection 100 that is larger than the strength value of the second connector 200, i.e. the second connector 200 would crack first.

What is claimed is:

1. A welding method for connecting a first connector to a second connector, comprising:
    providing the first connector having a first end;
    providing the second connector having a second end for being welded to the first end;
    overlapping the first end and the second end;
    at least partly covering an end section of the first end with a heat shield on a first surface of the first connector that facing the heat shield, the heat shield not covering the end section of the first end on a second surface of the first connector, the second surface opposite the first surface and facing toward the second end of the second connector;
    applying a contactless heating to a central section of the first end and melting the end section of the first end facing the second connector; and
    cooling the first end and the second end to form a weld connecting the first connector and the second connector, the first connector and the second connector extend in opposite directions from the weld.

2. The welding method of claim 1, wherein the first end has a length at least equal to a diameter of the first connector.

3. The welding method of claim 2, wherein the length of the first end is two times the diameter of the first connector.

4. The welding method of claim 1, wherein the end section of the first end has a length less than a diameter of the first connector.

5. The welding method of claim 1, wherein the central section of the first end is arranged in a middle of an axial extension direction of the first connector.

6. The welding method of claim 1, wherein the second end of the second connector and the heat shield are arranged only on opposite sides of the first end.

7. The welding method of claim 1, wherein the central section is heated using an arc welding process or an energy beam welding process.

8. The welding method of claim 7, wherein the arc welding process is a gas tungsten arc welding process.

9. The welding method of claim 7, wherein the energy beam welding process is a laser beam.

10. The welding method of claim 1, wherein the first connector has a higher thermal conductivity than the second connector, and/or the first connector has a lower melting temperature than the second connector.

11. The welding method of claim 1, wherein the second connector is a thermistor or a thermocouple, the weld connects a connecting terminal of the second connector with a connecting terminal of the first connector.

12. The welding method of claim 1, wherein the first connector is a stranded wire, a lead frame, or a massive wire.

13. The welding method of claim 1, wherein the second connector is a dumet wire.

14. The welding method of claim 1, wherein the first connector has a larger diameter than the second connector.

15. The welding method of claim 14, wherein the first connector has a diameter greater than or equal to 0.25 mm and less than or equal to 2.0 mm, and the second connector has a diameter greater than or equal to 0.1 mm and less than or equal to 0.5 mm.

16. The welding method of claim 1, wherein a face of the weld follows a convex shape and a pair of toes of the weld follow a concave shape, a symmetry axis of the weld is formed by the longitudinal axis of the first connector or a longitudinal axis of the second connector.

17. The welding method of claim 16, wherein the face is a prolate spheroid.

18. The welding method of claim 17, wherein an equator of the weld has a diameter of 1.5 times a diameter of the first connector.

19. The welding method of claim 1, wherein the heat shield:
    covers the first end in the second surface; and
    does not cover the second end of the second connector on the second surface.

20. The welding method of claim 1, wherein the first and second surfaces are each parallel to a longitudinal axis of the first connector.

21. The welding method of claim 1, wherein the contactless heating is provided by an electrode.

22. A welding method for connecting a first connector to a second connector, comprising:
provide the first connector having a first end;
providing the second connector having a second end for being welded to the first end;
overlapping the first end and the second end;
at least partly covering an end section of the first end with a heat shield on a first surface of the first connector that facing the heat shield, the heat shield not covering the end section of the first end on a second surface of the first connector, the second surface opposite the first surface and facing toward the second end of the second connector,
applying a contactless heating with a heat source to a central section of the first end and melting the end section of the first end facing the second connector, wherein:
the heat shield is arranged closer to the heat source in the second direction than the first end of the first connector and the second end of the second connector;
the first end of the first connector is arranged closer to the heat source than the second end of the second connector in the second direction, the second direction being a direction extending away from the heat source and transverse to the longitudinal axis of the first connector or a longitudinal axis of the second connector; and
cooling the first end and the second end to form a weld connecting the first connector and the second connector, the first connector and the second connector extend in opposite directions from the weld.

23. A welding method for connecting a first connector to a second connector, comprising:
providing the first connector having a first end;
providing the second connector having a second end for being welded to the first end;
overlapping the first end and the second end;
at least partly covering an end section of the first end with a heat shield on a first surface of the first connector that facing the heat shield, the heat shield not covering the end section of the first end on a second surface of the first connector, the second surface opposite the first surface and facing toward the second end of the second connector,
applying a contactless heating to a central section of the first end and melting the end section of the first end facing the second connector;
cooling the first end and the second end to form a weld connecting the first connector and the second connector, the first connector and the second connector extend in opposite directions from the weld; and
removing the heat shield and uncovering the end section of the first end of the first connector.

* * * * *